United States Patent [19]
Szlam et al.

[11] Patent Number: 5,828,731
[45] Date of Patent: *Oct. 27, 1998

[54] METHOD AND APPARATUS FOR NON-OFFENSIVE TERMINATION OF AN OUTBOUND CALL AND FOR DETECTION OF AN ANSWER OF AN OUTBOUND CALL BY AN ANSWERING MACHINE

[75] Inventors: Aleksander Szlam, Norcross; Chester P. Quinn, Chamblee, both of Ga.

[73] Assignee: Inventions, Inc.

[ * ] Notice: The term of this patent shall not extend beyond the expiration date of Pat. No. 5,581,602.

[21] Appl. No.: 754,151

[22] Filed: Nov. 22, 1996

Related U.S. Application Data

[63] Continuation of Ser. No. 372,889, Jan. 13, 1995, Pat. No. 5,581,602, which is a continuation of Ser. No. 17,108, Feb. 12, 1993, abandoned, which is a continuation-in-part of Ser. No. 901,436, Jun. 19, 1992, abandoned.

[51] Int. Cl.$^6$ ........................................... H04M 1/64
[52] U.S. Cl. .................................. 379/88; 379/265
[58] Field of Search ..................... 379/67, 88, 89, 379/92, 196, 197, 133, 265, 266, 309

[56] References Cited

U.S. PATENT DOCUMENTS 5,309,505   5/1994   Szlam et al. ...................... 379/265
5,430,792   7/1995   Jesurum et al. ...................... 379/265

Primary Examiner—Fan S. Tsang
Attorney, Agent, or Firm—Smith, Gambrell & Russell; Charles L. Warner, II

[57] ABSTRACT

A method and an apparatus are disclosed which provide for non-offensive termination of an outbound call which has been answered when an agent is not available to handle said outbound call. An outbound call is placed (10) and a determination is made (11) as to whether the call has been answered. If the call has been answered then a determination is made (12) as to whether the call was answered by a person or an answering machine. If the call was answered by a person then a determination is made as to whether an agent is available to handle said outbound call. If an agent is available then the agent is connected (13) to the outbound call. If an agent is not available then a termination message is played (15). If the call was answered by an answering machine then, depending upon a user-selected option (16), a termination message will be played (15) or an interactive session will be started (17). Also disclosed are a method and an apparatus for detecting an answering machine. The duration of a noise level signal is measured, the duration of a sound level signal is measured, and if the noise level signal is followed by a sound level signal, or if the sound level signal duration exceeds a predetermined duration, then the call is deemed to have been answered by an answering machine.

9 Claims, 13 Drawing Sheets

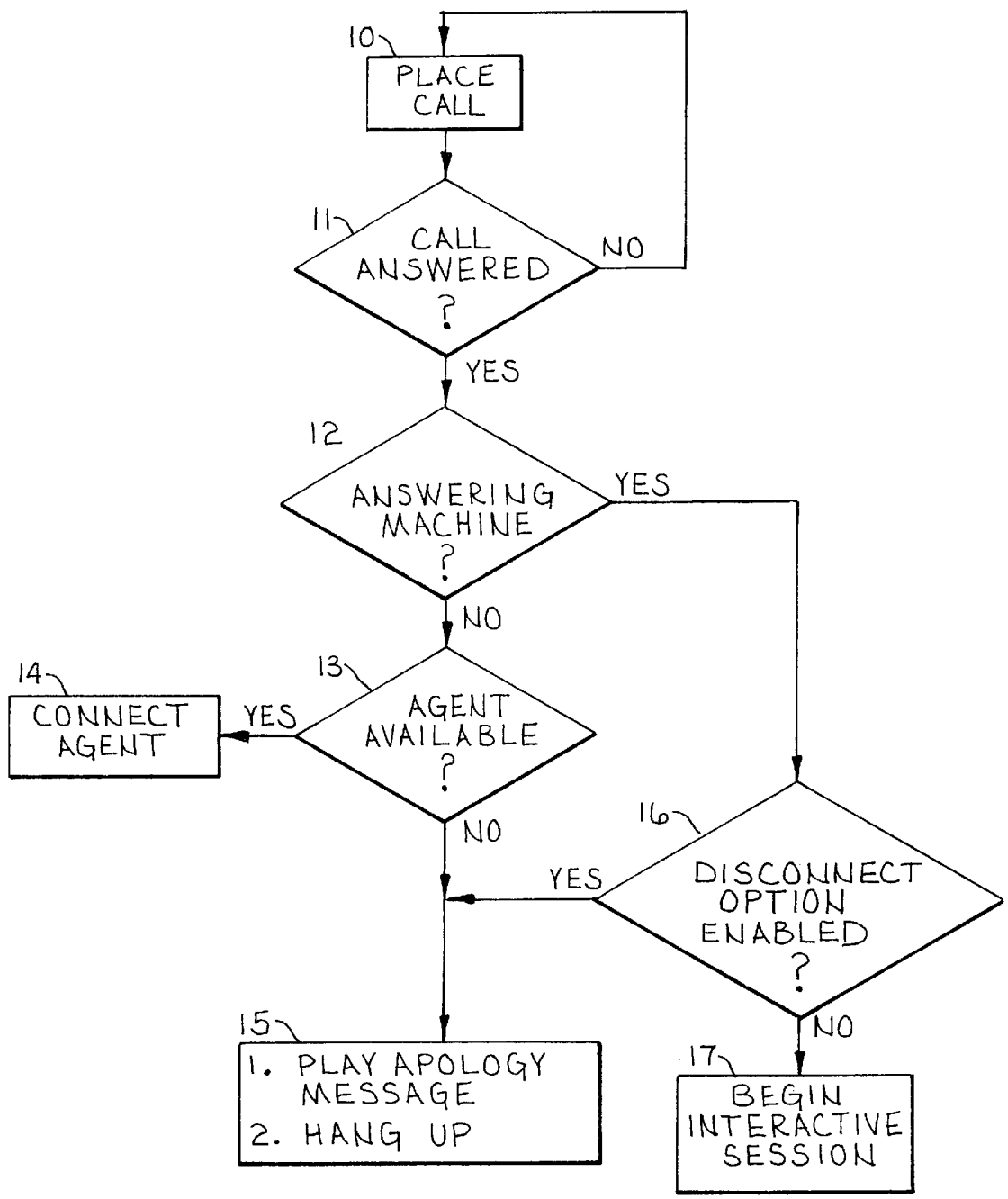
Fig — 1

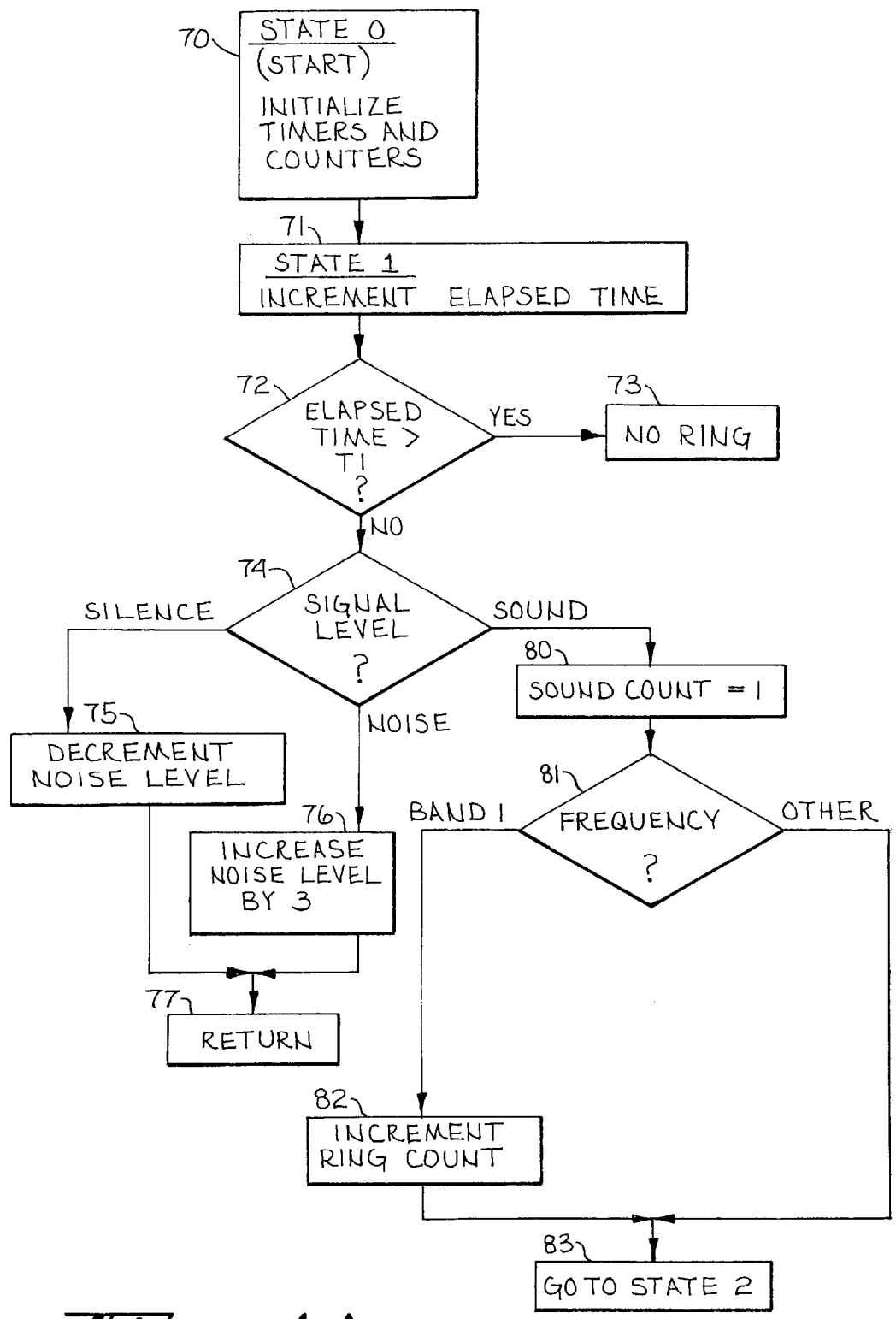
Fig — 4A

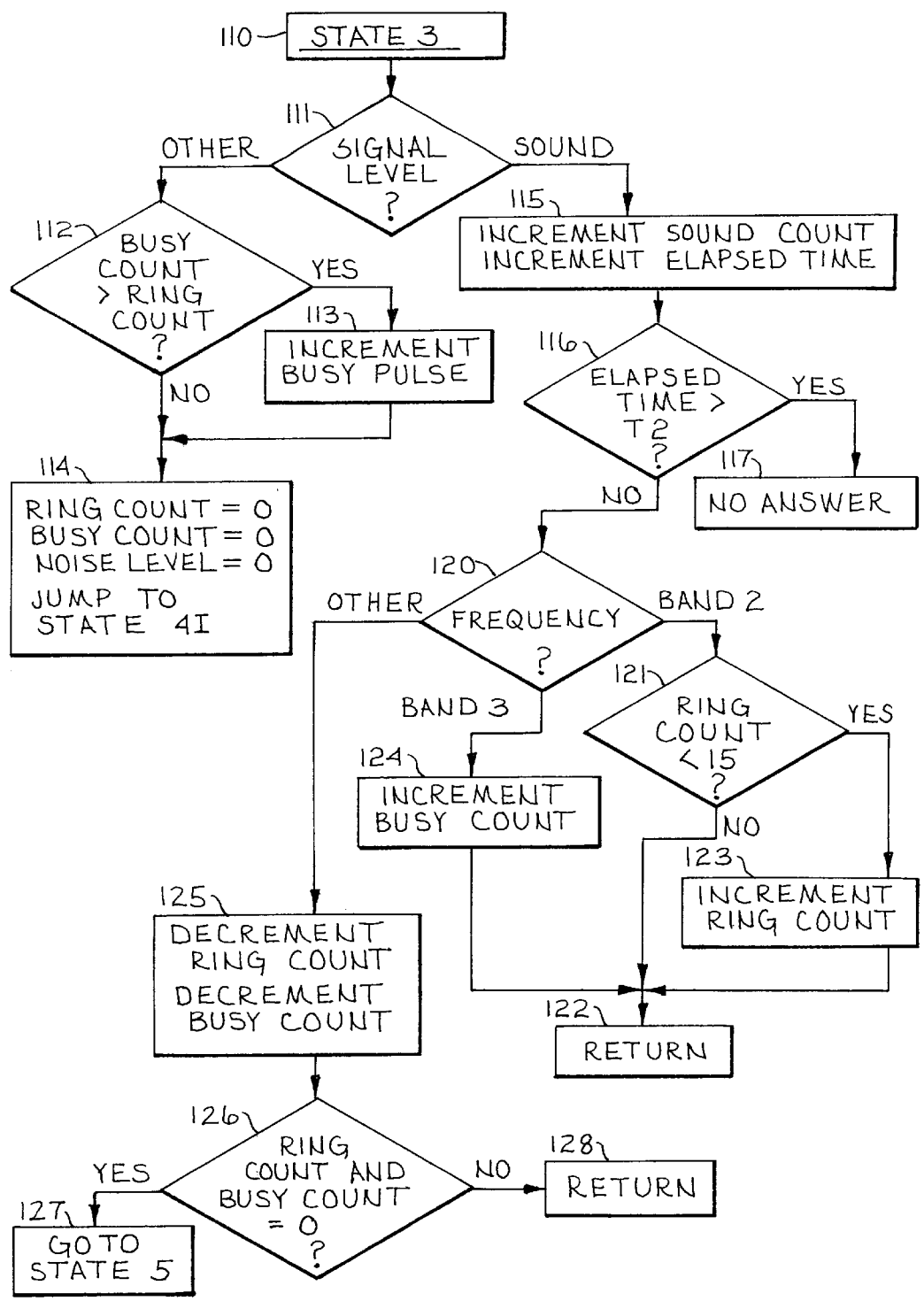
Fig — 4C

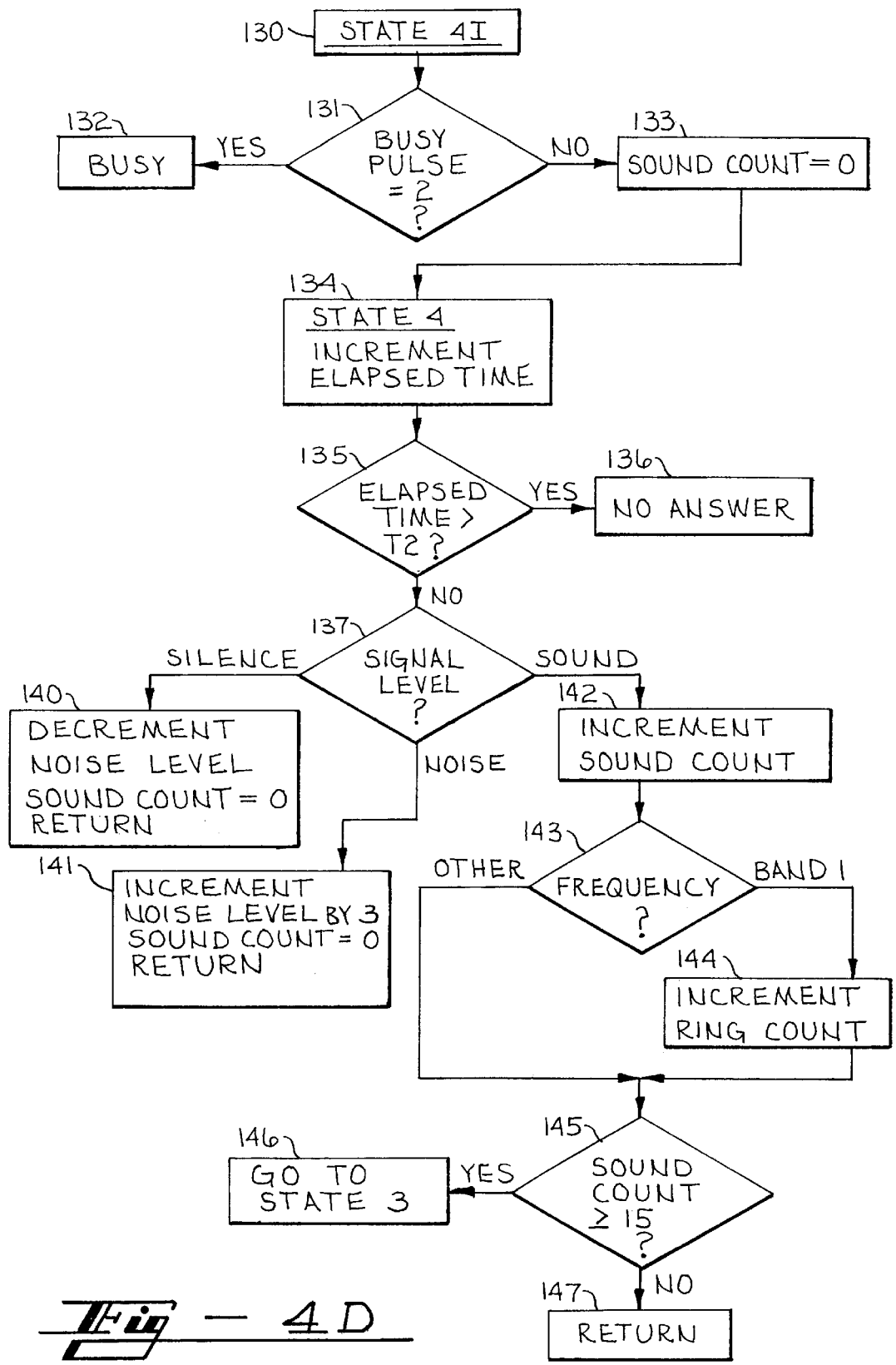
Fig — 4D

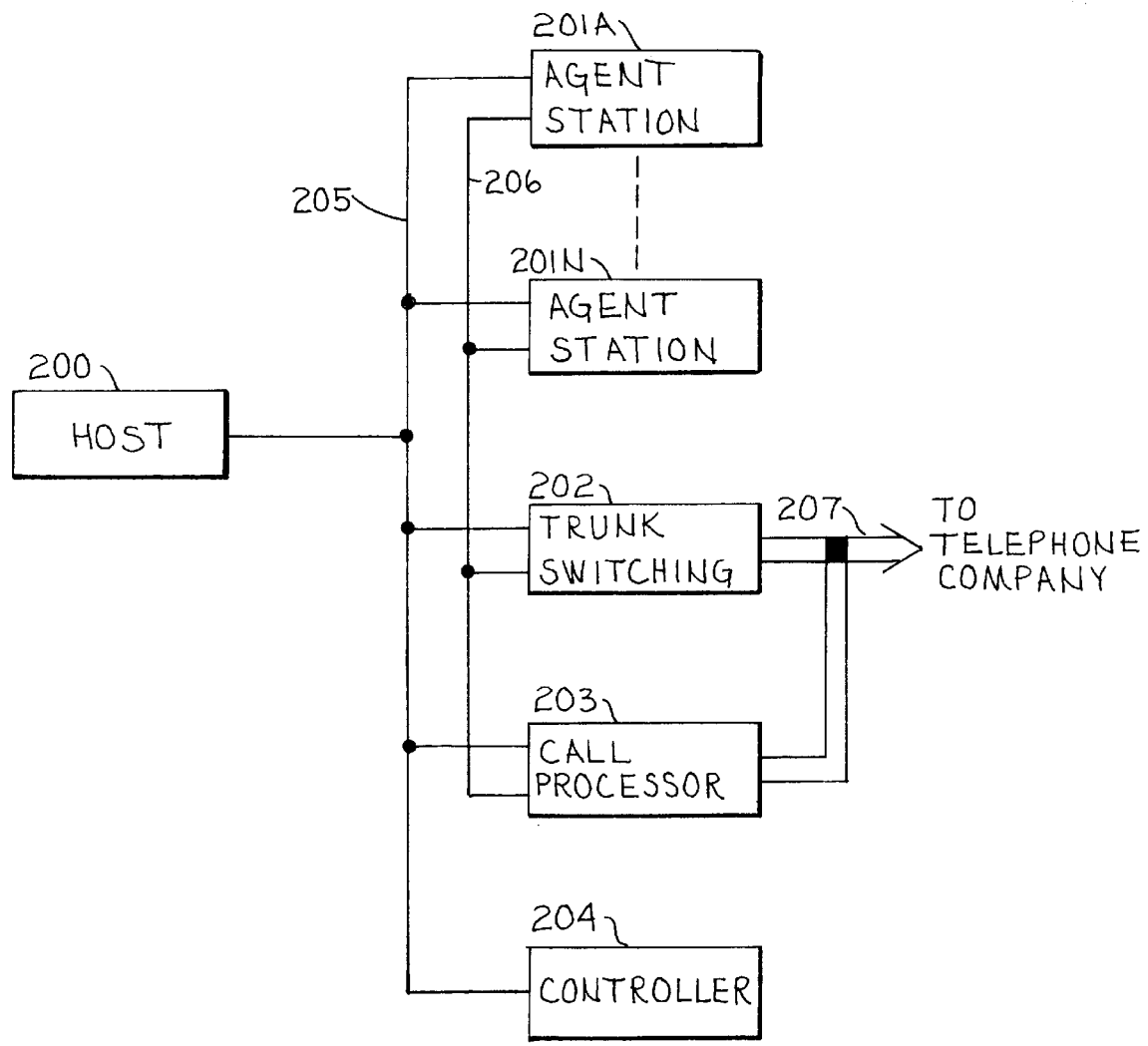
Fig — 5

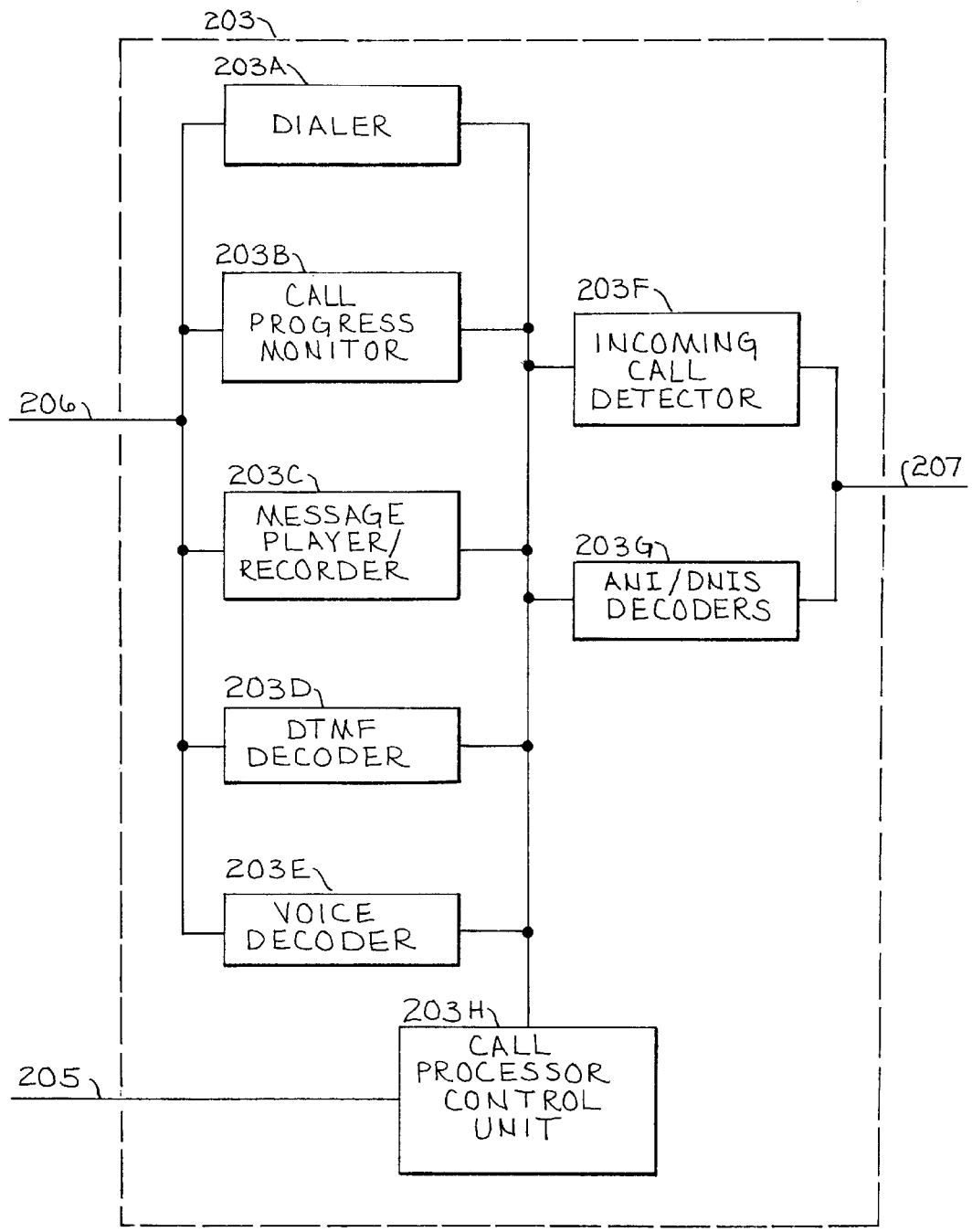
Fig — 6

METHOD AND APPARATUS FOR NON-OFFENSIVE TERMINATION OF AN OUTBOUND CALL AND FOR DETECTION OF AN ANSWER OF AN OUTBOUND CALL BY AN ANSWERING MACHINE

This application is a continuation of patent application Ser. No. 08/372,889 filed Jan. 13, 1995, U.S. Pat. No. 5,581,602, which is a continuation of patent application Ser. No. 08/017,108 filed Feb. 12, 1993 (now abandoned), which is a continuation-in-part of patent application Ser. No. 07/901,436 filed Jun. 19, 1992 (now abandoned).

TECHNICAL FIELD

The present invention relates to automatic dialing systems and in particular to a method and an apparatus for non-offensive termination of an outbound call which has been answered before an agent has become available, to handle the outbound call or which was mistakenly determined to have been answered by an answering machine and will be terminated without connecting the call to an agent. The present invention also relates to call progress detection devices and in particular to a method and an apparatus for determining whether a call has been answered by a person or by a machine.

BACKGROUND OF THE INVENTION

Automated dialing systems are, in general, well known. For example, U.S. Pat. Nos. 4,797,911, 4,894,857, and 5,070,525, all of which are assigned to the assignee of the present invention, disclose automated outbound dialing and inbound call processing systems. In addition, certain other advantageous techniques are described in U.S. patent application Ser. No. 533,489, filed Jun. 5, 1990, entitled "Method And Apparatus For Dynamic And Interdependent Processing Of Inbound Calls And Outbound Calls", and U.S. patent application Ser. No. 703,158, filed May 20, 1991, entitled "Automated Voice System For Improving Agent Efficiency And Improving Service To Parties On Hold", both of which are assigned to the assignee of the present invention. These patents and patent applications are herein collectively referred to as "documents" and are herein incorporated by reference. The systems described in these documents improve the efficiency of an agent by eliminating the need for the agent to look up a customer telephone number, dial the telephone number, wait for the call to be answered, etc. In addition, the systems described in these documents allow certain information to be gathered without the assistance of an agent so that some incoming calls may be completely processed without agent intervention. In addition, the systems described in these documents automatically adjust the number of agents and lines for inbound calls and the number of agents and lines for outbound calls in response to traffic conditions and customer requirements, relieve the agent of the necessity of waiting for a party to be summoned, and advise the called or calling parties of their status in a hold queue and/or the time they may expect to remain on hold.

With respect to outbound calling systems, a call pacing algorithm is generally used to adjust the rate of placement of outbound calls so that, ideally, when a called party answers an agent is available, and when an agent is available a called party has just answered. However, in practice, because a call may last a shorter time or a longer time than expected, an agent may not be available when a called party answers or an agent may be available when a called party has not yet answered. In order to maximize the utility of the agents, users of such systems frequently demand that the call pacing algorithm be adjusted to err on the side of calling too many parties rather than too few parties.

If a called party answers before an agent is available then, in those states where it is permitted, the party may be placed on hold or an interactive session may be conducted. In addition, the above-referenced U.S. Pat. No. 5,070,525 discloses a method which serves to reduce the number of called parties that answer when an agent is not available by monitoring the connect time of the agents and terminating a call, before the call is answered, if it appears that an agent will not be available at the time a call is expected to be answered.

However, some calls will still be answered when an agent is not available to handle the call. Therefore, there is a need for a method and an apparatus for terminating, in a non-offensive manner, an outbound call which has been answered when an agent is not available to handle the outbound call.

Furthermore, many systems use algorithms in an attempt to determine whether the call was answered by a live person or by a machine, such as an answering machine. The systems generally hang up if the call was answered by a machine. However, if the algorithm incorrectly determines that the call was answered by a machine when the call was actually answered by a live person then the person may take offense when the system abruptly terminates the call by hanging up. Therefore, there is a need for a method and an apparatus for terminating, in a non-offensive manner, an outbound call which was incorrectly determined to have been answered by an answering machine.

In addition, agent efficiency is reduced if the agent connected to a call which has been answered by an answering machine. Therefore, there is a need for a method and an apparatus for determining whether a call has been answered by a person or by a machine.

In some areas, particularly in some countries, the incoming signal on the telephone line may be corrupted by noise bursts, including bursts which have a pattern like that of ignition noise. In such areas the noise bursts may be occasionally interpreted as an answer of the outgoing call, even while the ringing for the outgoing call is still appearing on the telephone line. This can cause an agent to be prematurely connected to an outgoing call before it is answered, or erroneously connected to an outgoing call which is never answered. Therefore, there is a need for a noise suppression technique which minimizes the effects of such noise.

SUMMARY OF THE INVENTION

The present invention provides a method and an apparatus for the non-offensive termination of an outbound call which has been answered before an agent has become available. Generally stated, if a call is answered and an agent is not available then a non-offensive termination message will be played, such as a message which apologizes for the inconvenience of the call or indicates that a mistake, such as a wrong number was made. The call is then terminated.

The present invention therefore provides a method and an apparatus for politely or non-offensively terminating an outbound call which has been answered when an agent is not available to handle the answered outbound call. The present invention further provides a method and an apparatus for politely or non-offensively terminating an outbound call which was answered by a person but was incorrectly determined to have been answered by a machine, such as an answering machine. In addition, a plurality of messages, voices, and genders are used so that a different message/voice/gender combination is used each time that the outbound call is subsequently placed.

One aspect of the method for processing outbound calls includes placing an outbound call, determining whether said outbound call has been answered, determining whether an agent is available to answer said outbound call, and if said call has been answered and an agent is not available to handle said outbound call then playing a termination message for said outbound call.

Another aspect of the method for processing outbound calls includes placing an outbound call, determining whether said outbound call has been answered, if said outbound call has been answered then determining whether said outbound call was answered by a machine, and if said outbound call was answered by a machine then playing a termination message for said outbound call.

The apparatus for processing outbound calls includes a plurality of agent stations, first means for initiating an outbound call by dialing a telephone number on a telephone trunk, second means for playing a termination/message for said outbound calls, and third means for providing said telephone number to said first means, for determining whether said outbound call has been answered, for determining whether an agent at one of said agent stations is available, and for causing said second means to play said termination message for said outbound call if said outbound call has been answered and an agent is not available to handle said outbound call.

The apparatus for processing outbound calls also includes first means for initiating an outbound call by dialing a telephone number on a telephone trunk, second means for playing a termination message for said outbound call, and third means for providing said telephone number to said first means, for determining whether said outbound call has been answered by a machine, and for causing said second means to play said termination message for said outbound call if said outbound call was answered by a machine.

Furthermore, the present invention provides a method and an apparatus for quickly and accurately determining whether a call has been answered by a person or by a machine.

One aspect of the method for detecting an answer of an outbound call on a telephone trunk by machine includes comparing the level of a signal on said telephone trunk with a threshold level, measuring the period that said level of said signal is above said threshold level, comparing said period to a predetermined duration, and declaring said outbound call to have been answered by machine if said period exceeds said predetermined duration.

Another aspect of the method for detecting an answer of an outbound call on a telephone trunk by machine includes comparing the level of a signal on said telephone trunk with a first threshold, measuring the period that said level is above said first threshold, comparing the level of said signal on said telephone trunk with a second threshold, measuring the period that said level is above said second threshold, and if said period that said signal is above said first threshold exceeds a first duration, and said period that said signal is above said second threshold exceeds a second duration, then declaring said outbound call to have been answered by a machine.

The present invention also provides a noise suppression technique which minimizes the effects of pulse noise, such as ignition noise, so that there is less likelihood of pulse noise causing an erroneous answer indication. The present invention measures the signal strength over ten millisecond periods. Briefly stated, the output signal is not allowed to increase unless the input signal has increased for two consecutive sample periods. Because pulse noise generally has a duration of only one sample time this process has the effect of eliminating the pulse noise. The processed sample is then provided to the answer detection process. The elimination of the pulse noise signals improves the reliability of the answer detection process.

Other advantages of the present invention will become apparent by a review of the drawing and the detailed description below.

BRIEF DESCRIPTION OF THE DRAWINGS

FIG. 1 is a flow chart illustrating the basic operation of the preferred embodiment of the present invention.

FIGS. 4A through 4F are a flow chart illustrating the answering machine detection process of the present invention.

FIG. 5 is a block diagram of the preferred embodiment of the present invention.

FIG. 6 is a block diagram of a typical call processor.

DETAILED DESCRIPTION

Figure 2A:
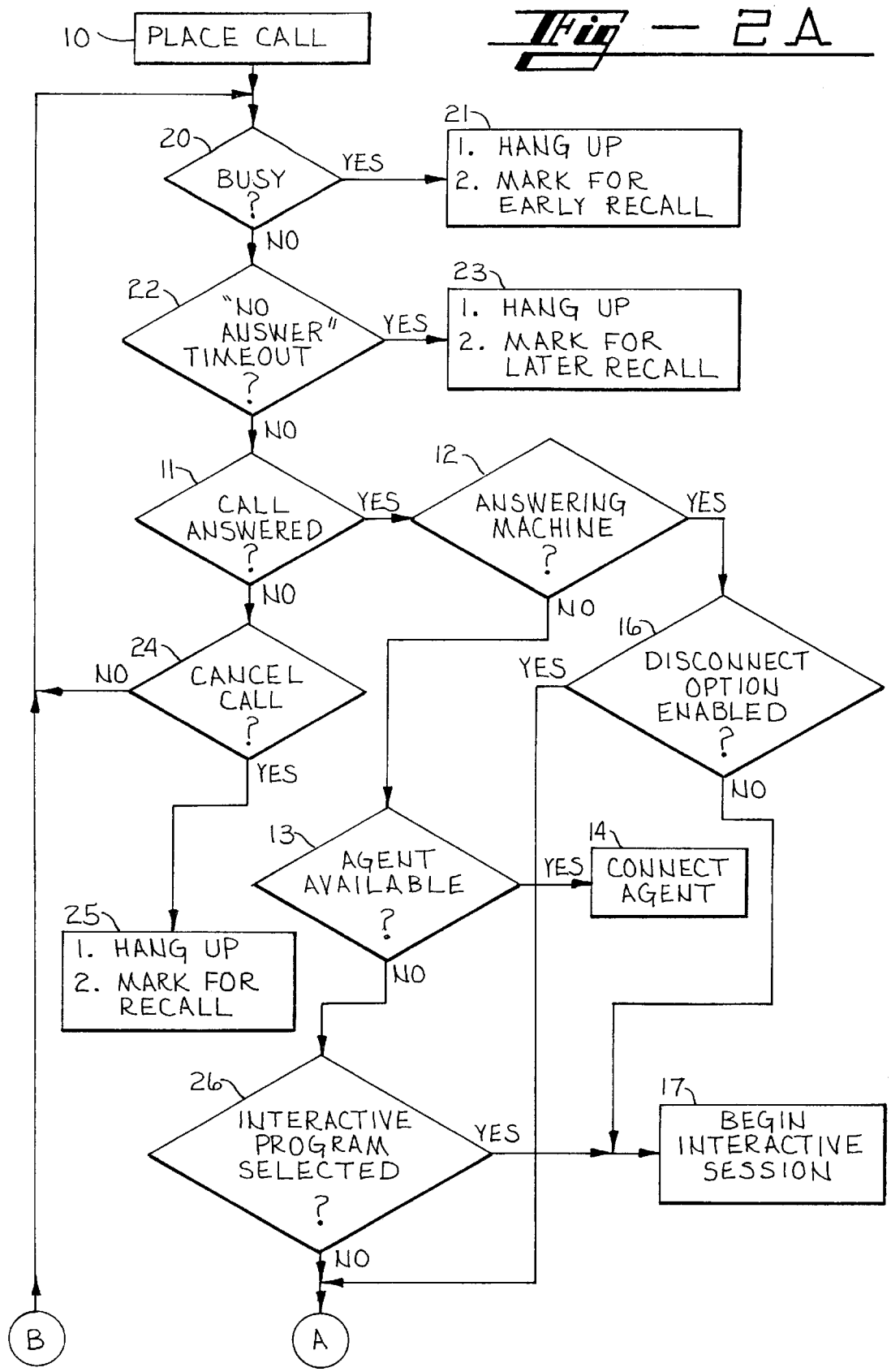
FIGS. 2A and 2B are a detailed flow chart illustrating the preferred operation of the present invention.

Turn now to the drawing, in which like numerals represent like components throughout the several figures. FIG. 1 is a flow chart illustrating the basic operation of the preferred embodiment of the present invention. In step 10 the outbound call is placed. In decision 11, a determination is made as to whether the call has been answered. If the call has not been answered then a return is made to step 10 and another call is placed. If, at decision 11, the call was answered then, in decision 12, a determination is made as to whether the call was answered by a machine, such as an answering machine. If not, then, in decision 13, a determination is made as to whether an agent is available to handle the outbound call. If so, then an agent is connected to the outbound call in step 14. If an agent is not available then, in step 15, a termination message such as an apology message or other non-offensive message is played to the party or the answering machine that answered the outbound call and then the call is terminated. The present invention reduces the irritation of the call party because, rather than being abruptly hung up on or being asked to wait on hold until an agent becomes available, a message is played, such as an apology message, which is drafted to be non-offensive. The present invention contemplates messages such as: "Excuse me, I must have dialed the wrong number.", "I apologize, I must have misdialed.", "I'm sorry, they must have given me the wrong number.", and other messages to the effect that the calling party has inadvertently called the called party and may be apologizing for the inconvenience to the called party. The use of an apologetic phrase, such as "excuse me", "I'm sorry", etc., in a message is preferred but is not required. It will be appreciated that such a message is less likely to cause the called party to be irritated than if the called party is put on hold or the call is simply abruptly terminated with no explanation. The present invention therefore injects some courtesy into the automatic calling process and reduces the number of called parties who activate call blocking, last call callback, or who monitor an automatic number identification (ANI) or "Caller ID" display to determine the telephone number of the calling party.

If, at decision 12, the determination is that the call was answered by a machine, such as an answering machine, then, in decision 16, a determination is made as to whether the system user has selected the "disconnect" option. If so, then, in step 15, a message, as previously described, is played and then the call is terminated. In this case the message is played to an answering machine if the answering machine detection algorithm was correct, or played to a person if the detection algorithm was incorrect. If the "disconnect" option was not selected then, in step 17, an interactive session is begun. The interactive session 17 may be as simple as playing a holding message to the called party, or connecting an agent to the party, or may include playing messages to the called party, obtaining responses, and forwarding those responses and other information to an agent and connecting the agent to the called party when the agent becomes available. The interactive session should have a no response time-out feature so that, if an answering machine answers the call, the call will be terminated because of a lack of response to the message played.

The use of an answering machine detection process is preferred but is not required. If answering machine detection is not used then the "yes" output of decision 11 is connected to the input of decision 13.

Figure 2B:
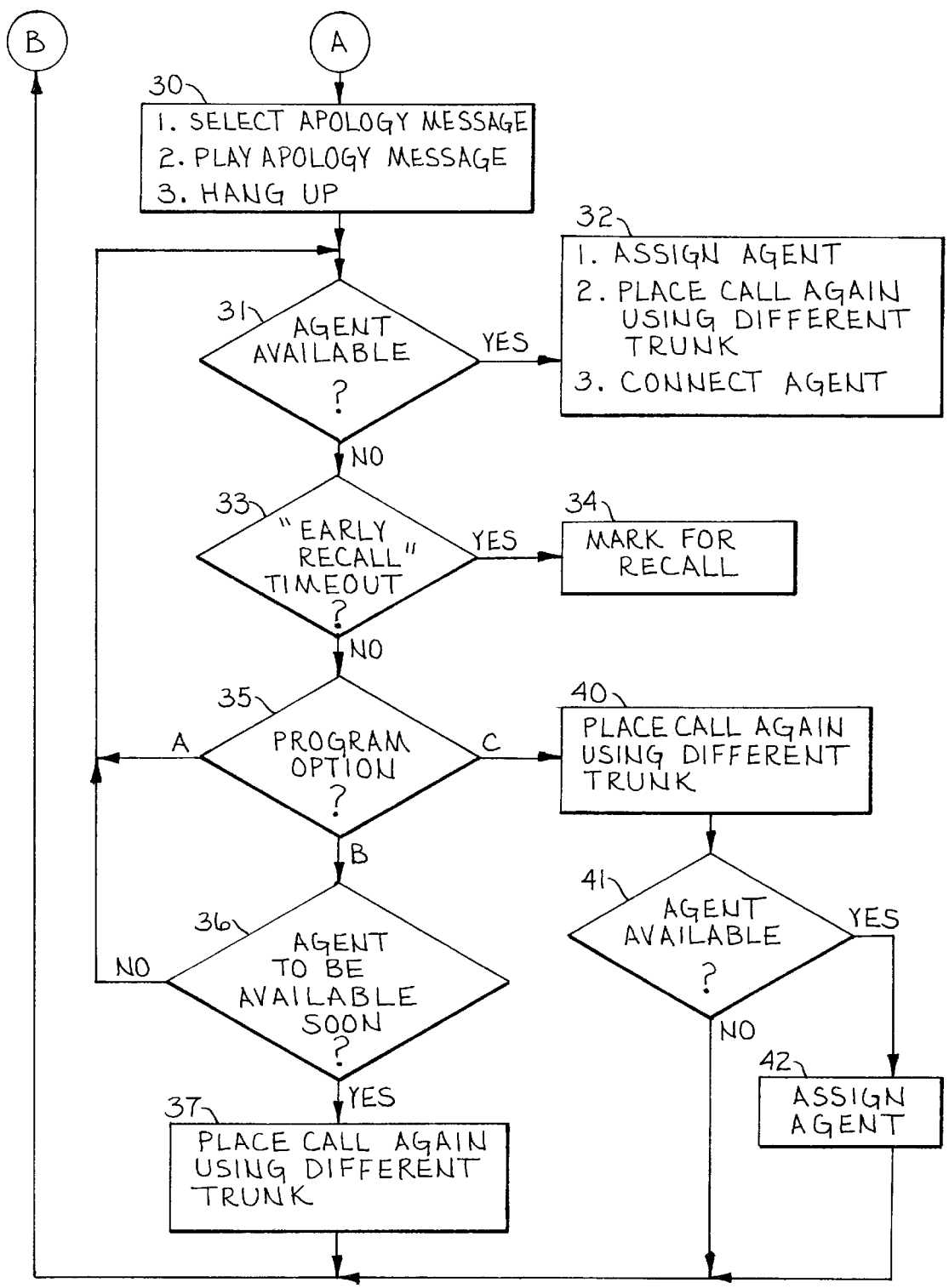

FIGS. 2A and 2B are a detailed flow chart illustrating the preferred operation of the present invention. In step 10, the outbound call is placed. In decision 20, a determination is made as to whether a busy signal is returned. If so then, in step 21, the call is terminated and the record is marked for an early recall to that number. If the called number is busy then it is highly probable that someone is at home and therefore the call should be marked for an early recall so that it will be placed again fairly soon. Of course, it is possible that the called number is busy because it is off-hook or because an answering machine has answered an earlier call and has not yet disconnected.

If, in decision 20, the called number is not busy then, in decision 22, a determination is made as to whether a "no answer" timeout has occurred. If so then it is presumed that the called party is not at home or is not answering the telephone and, in step 23, the call is terminated and the record is marked for a later recall. A call marked in this manner will not be recalled as quickly as a call which was marked that a busy signal had occurred.

If a "no answer" timeout has not occurred then, in decision 11, a determination is made as to whether the call has been answered. If not then, in decision 24, a determination is made as to whether the call should be cancelled, such as before a called party has answered. If not then a return is made to decision 20. If so then, in step 25, the call is terminated and the record is marked for a recall to that number.

If, in decision 11, a call has been answered then, in decision 12, a determination is made as to whether the call was answered by an answering machine. If not, then, in decision 13, a determination is made as to whether an agent is available. If so then, in step 14, the call is connected to the available agent.

Some systems attempt to determine whether a live person or an answering machine has answered the call. In the preferred embodiment, live persons and answering machines may be treated in the same manner: an apology message is played and the call is then terminated. The reasoning therefor is that an answering machine detection process may occasionally be incorrect and it is better to play a termination message to an answering machine than to abruptly hang up on a live person. Furthermore, even if an answering machine is properly detected, playing a termination message, which is recorded by the answering machine, reduces the likelihood that the called party will activate the last call callback feature to determine who called and did not leave a message. If an answering machine is detected, the record is preferably marked as if a "no answer" timeout had occurred.

If, at decision 12, a determination is made that the call was answered by a machine, then, in decision 16, a determination is made as to whether the user has selected the "disconnect" option. If not then the process proceeds to step 17 where an interactive session is conducted. If so then the process proceeds to step 30.

If, in decision 13, an agent is not available, then, in decision 26, a determination is made as to whether the user has selected the option of an automatic interactive program. If so then, in step 17, an automatic interactive session will be started which does not require the immediate presence of an agent but which may connect the party to an agent when an agent becomes available.

If, in decision 26, the interactive program was not selected then, in step 30, a termination message is selected, the selected termination message is played, and the call is terminated.

Then, in decision 31, a determination is made as to whether an agent is now available. If so then, in step 32, the agent is assigned to that call rather than being connected to another call, the call is placed again, preferably using a different trunk in the event that call blocking or ANI is being used, and the agent is connected so that the agent will be on-line when the called party answers. It is preferred that the call be placed as soon as possible because it has been determined, by virtue of detecting an answer, that someone is at the called number.

If, at decision 31, an agent is not available then, in decision 33, a determination is made as to whether an "early recall" timeout has occurred. The purpose of the "early recall" timeout is similar to that of marking a busy signal; it has been determined that someone is at home to answer the call and therefore the call should be placed as soon as possible. However, in step 32, an agent is being held for that call and so the efficiency of the agent will be reduced because the agent will be holding while the call is placed and is ringing. After a point in time, there is a reduced likelihood that the party will still be at home to answer the call. It may occur that, because of the volume of inbound calls and/or the duration of inbound and/or outbound calls, an agent will not be available during the "early recall" timeout period. Therefore, if an "early recall" timeout has occurred then, in step 34, the call is marked for recall but an agent is not held in waiting for the call.

If, at decision 33, the early recall timeout has not occurred then, in decision 35, a determination is made as to whether the user has selected program option A, B, or C. Program option A specifies that, during the early recall timeout period, the call will only be placed if an agent is available to be held for the call. Program option B specifies that the call may be placed again if an agent is predicted to be available soon, as determined by call pacing or other algorithms. Program option C specifies that the call will be placed again, preferably immediately or extremely soon, without waiting for an operator to become available or to be predicted to become available.

If program option A was selected by the user then a return is made to decision 31.

If program option B was selected then, in decision 36, a decision is made as to how soon an agent is expected to be available. The duration of the ring time on outbound calls is measured and recorded so as to obtain an estimate of the expected duration of the ring time for future calls. An agent is deemed to be available soon if an agent is expected to be available within approximately the expected duration of the ring time. Therefore, the call is placed so that the call is expected to be answered at approximately the same time that an agent is expected to be available. If an agent, at decision 36, is not expected to be available soon then a return is made to decision 31. However, if an agent is expected to be available soon, then, in step 37, the outbound call is placed again, preferably using a different trunk so as to avoid call blocking or ANI, and a return is made to decision 20.

If program option C was selected then, in step 40, the call is placed again, as described above. Then, in decision 41, a determination is made as to whether an agent is available. If not then a return is made to step 20. If so then, in step 42, the available agent is assigned to the call and then a return is made to step 20. In one embodiment of the present invention decision 41 also determines whether an agent is expected to be available soon, as in step 36. If so then the process proceeds to step 42.

Figure 3:
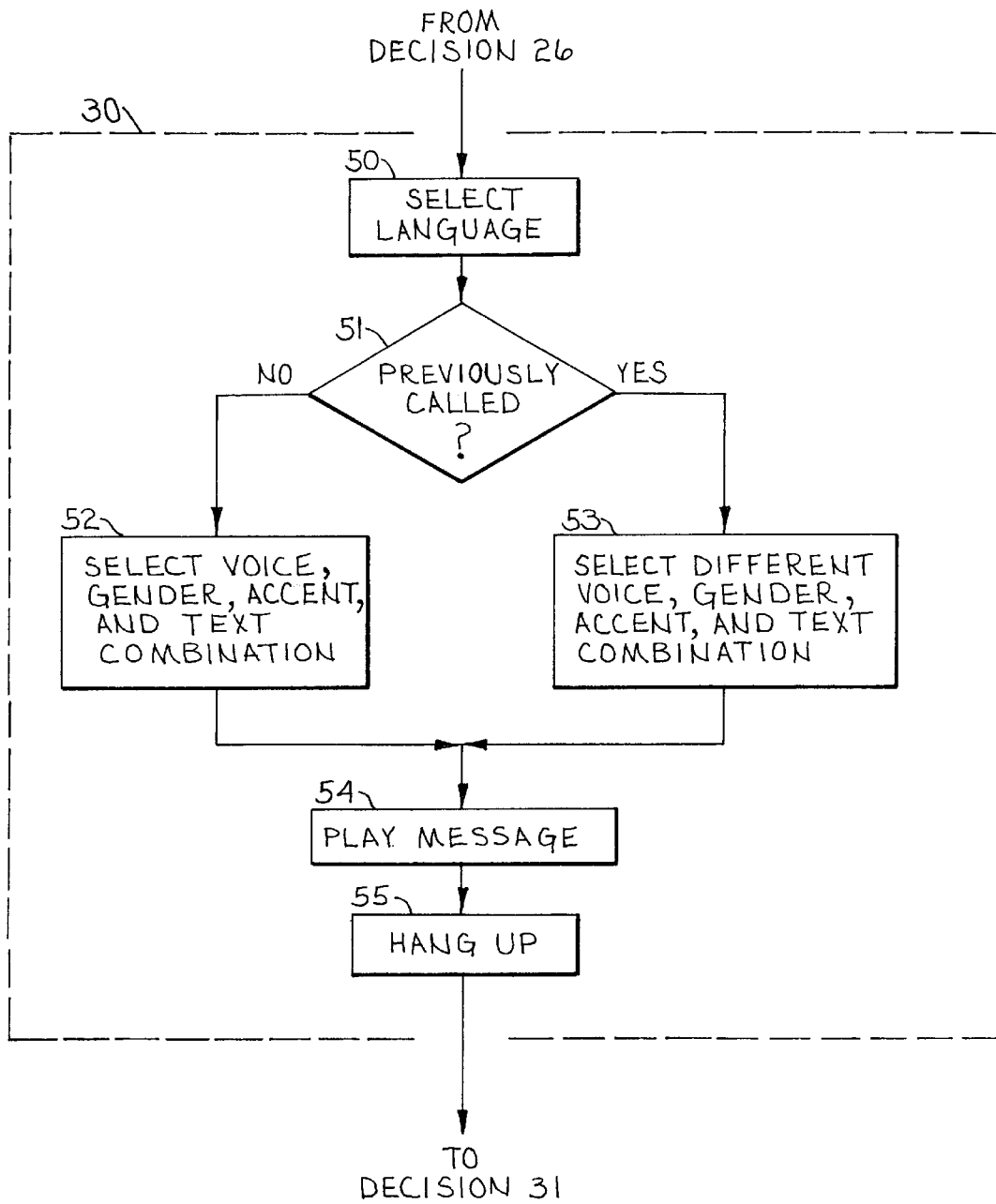
FIG. 3 is a flow chart of the voice/gender/message text selection process of the present invention.
Figure 4B:
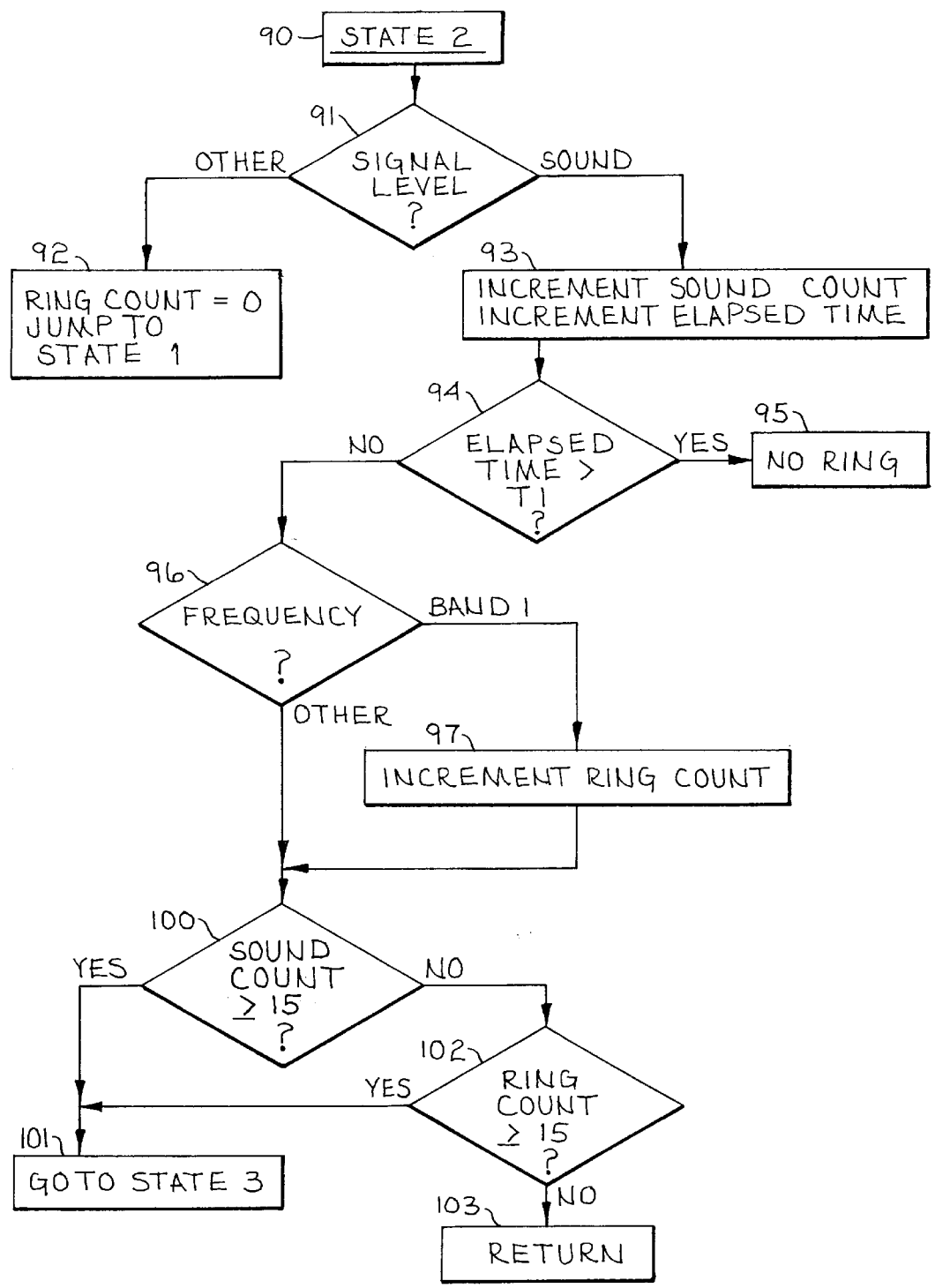
Figure 4E:
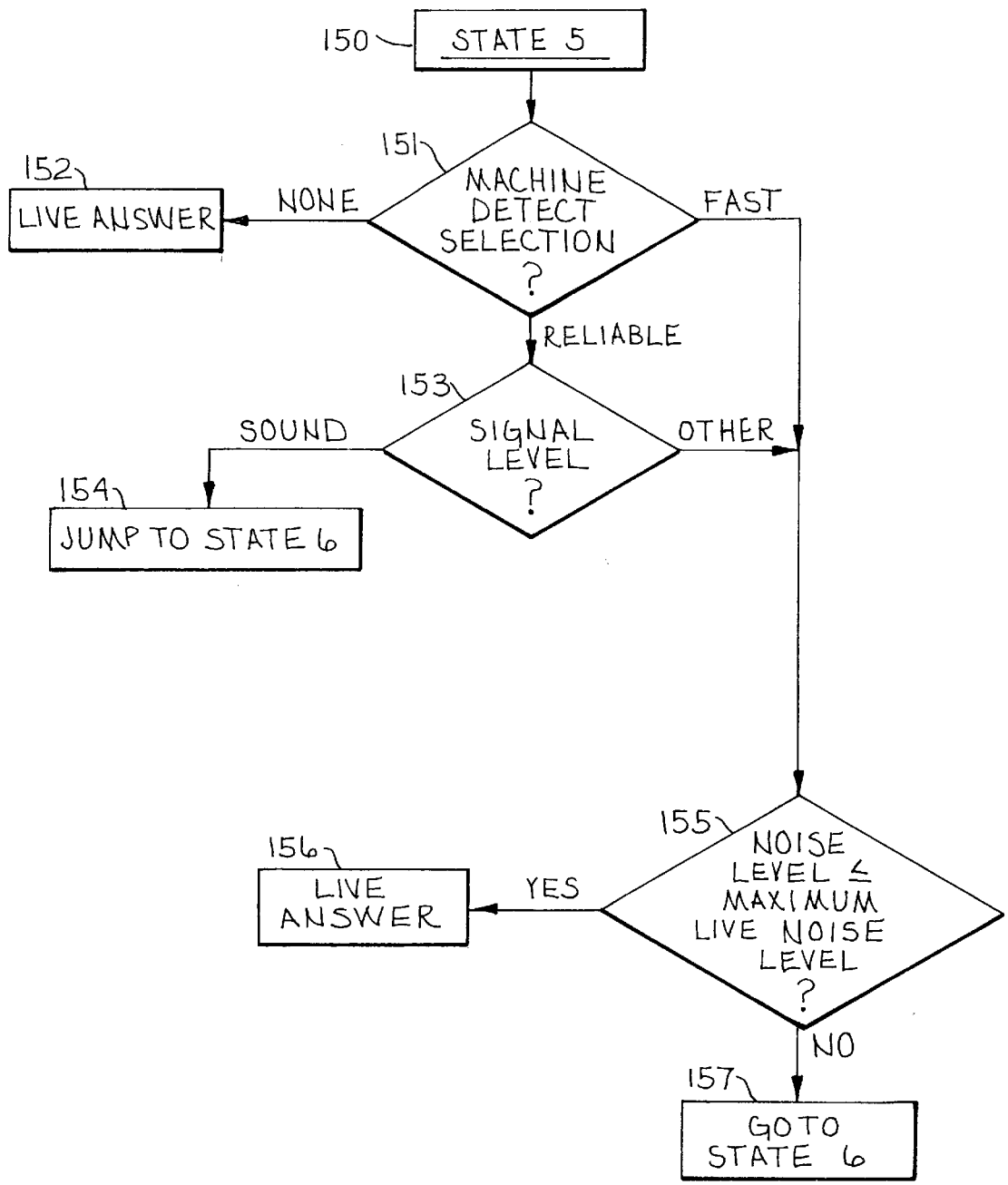
Figure 4F:
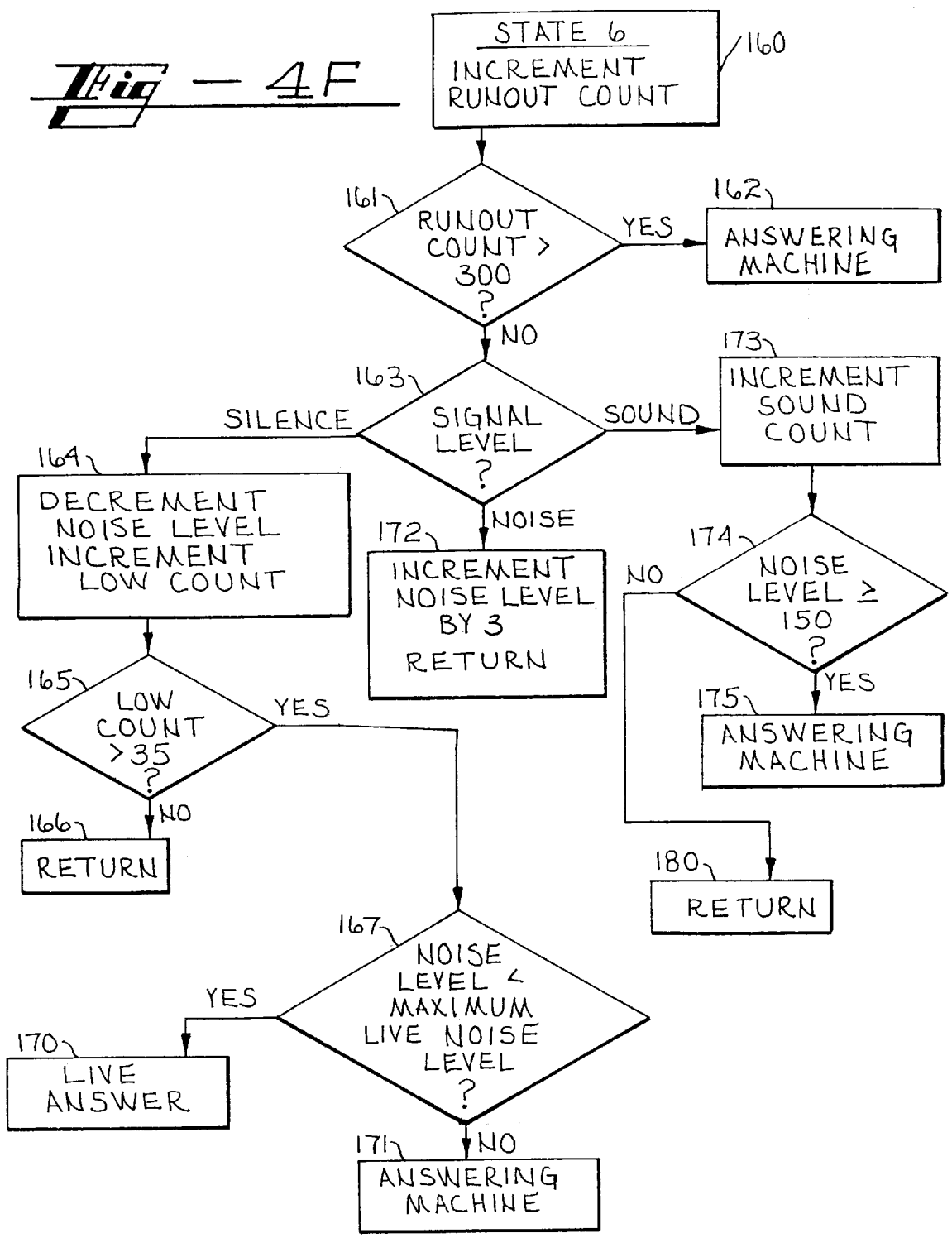

Turn now to FIG. 3 which is a flow chart of the voice/gender/message text selection process of the present invention. In step 50, a language for the termination message is selected. The language selected may be based upon the fact that the called party is known to speak only a particular language or to prefer speaking a particular language. In decision 51 a determination is made as to whether the particular telephone number has been previously called. If not then, in step 52, the voice, gender and accent for the termination message are selected, and the particular text for the termination message is selected.

If, at decision 51, it is determined that the telephone number has been previously called, then, in step 53, a different voice/gender/message text combination is selected. Therefore, in the event that it is necessary to hang up on the called party more than one time, the use of a different voice/gender/message text combination will give the called party the impression that the calls were unrelated, thereby reducing the irritation of the called party and reducing the likelihood that the called party will activate call blocking, look closely at the ANI display before answering the call, or activating a last call callback feature. For example, if the first call used a man's voice and a first message text then the second call may use a woman's voice and a second message text, use a child's voice and a third message text, or a voice with an accent characteristic of a different part of the country or even a different country, or use other techniques designed to leave the called party to believe that the two or more calls were totally unrelated.

In an alternative embodiment, the voice/gender/message text combination is randomly selected and the telephone trunk to be used is randomly selected.

After steps 52 and 53 then, in step 54 the message is played, with the selected voice/gender/message text and, in step 55, the call is terminated.

Turn now to FIGS. 4A through 4F which are a detailed flow chart illustrating the preferred operation of the answering machine detection process. The preferred embodiment of the present invention is a state machine having seven states, including the starting state. A particular state is executed only once in a 10 millisecond time slot. Furthermore, except as noted, only one state is executed during any 10 millisecond time slot. Therefore, when a RETURN in encountered the system will return to the starting step for that state but will not begin to execute that state until the next 10 millisecond period has begun. Likewise, if a GO TO is encountered, the system will move to the specified state but will not begin execution of that state until the next 10 millisecond period begins. The exception is a JUMP statement, which causes an immediate transfer to that state and immediate initiation of the steps in that state, without waiting for the next 10 millisecond period to begin. Briefly stated, the process operates by measuring the signal amplitude and labeling the signal as silent, noise, or sound. If the signal level is below a first threshold, nominally a noise cutoff threshold, the signal is considered to be silence. If the signal level is above a second threshold, a threshold which is representative of answering machines and live persons, then the signal is considered to be sound. If the signal level is between these two thresholds then the signal is considered to be noise. The present invention detects an answering machine in two ways.

If a live person answers a telephone call then the initial greeting or salutation will typically be very short, such as "hello", followed by a period of silence where the answering party waits for the calling party to reply. If the calling party does not reply then the answering party will typically repeat the greeting, and wait again for a reply. However, the message on an answering machine typically runs continuously, from several seconds to several tens of seconds, without any pauses to allow the calling party to reply until the message has been completely delivered. Therefore, one method of determining whether an answering is present is to measure the duration that the signal level is classified as sound. If the duration is three or more seconds then the process declares that the outbound call has been answered by an answering machine. The duration measured is the continuous duration, that is, the signal level must be sound without pauses, except that extremely small pauses are disregarded. In the preferred embodiment, pauses less than 350 milliseconds are disregarded. If a pause is greater than 350 milliseconds then the sound is not considered to be continuous. Frequency analysis is used to separate ring and busy signals from other signals. A signal which is in the telephone company ring and no busy signal band (400 to 750 Hz) is not considered to be voice. However, if the dominant signal has a frequency outside of this band then the signal, if the signal level is correct, is considered to be voice.

When a person records a message on an answering machine there is typically a brief period, nominally one half to one and one half seconds, between the time that the person presses the button or buttons to record the message on the machine and the time that the person actually begins speaking the message that is to be recorded. Then, when a call is answered by the answering machine, there will be a short period of hiss or other tape noise before the message begins playing. The preferred embodiment looks for the presence of this noise and, if this noise has been present for at least one half second when a sound-level signal appears then the process will declare that the call has been answered by an answering machine.

State 0 is the initialization state. It is run one time for call and causes state 1 to be executed in the same 10 millisecond time period. Upon starting 70 in state 0, the timers and counters are set to their initial values (zero). These are the elapsed time counter, the ring counter, the sound time counter, the noise level timer, the busy counter, the runout count timer, the low count timer, and the busy pulse counter. The elapsed time counter measures the time since the process was started. The ring counter and the busy counter keep track of the number of 10 millisecond intervals that a ring signal or a busy signal, respectively, has been present. The sound counter keeps track of the number of 10 millisecond intervals that a sound signal has been present. The noise level time counter keeps track of the number of 10 millisecond intervals that a noise level signal has been present. The runout counter keeps track of the number of 10 millisecond intervals that the process has been in state 6. The low count timer keeps track of the number of 10 millisecond intervals that a noise or sound level signal has been interrupted by silence. This is used to determine whether the sound is continuous or not. The busy pulse count keeps track of the number of busy pulses that have been received over the telephone trunk. The system then enters state 1 in step 71, and the elapsed time counter is incremented.

In state 1 the system is waiting for detection of initial sound. If the initial sound is a ring or busy frequency signal the ring counter is incremented. After the elapsed time is incremented in step 71 then, in decision 72, a determination is made whether the elapsed time has exceeded time T1. This decision tests whether more than 20 seconds have elapsed without a ring back signal. If so then there may be a line fault or other problem and, in step 73, a NO RING is declared. If a NO RING is declared then an appropriate procedure should be followed, such as redialing the call a limited number of times, reporting that the trunk is out of service, signaling an agent or administrator that there is a problem, rescheduling the call for a later attempt, etc. If the elapsed time is not greater than T1 then, in step 74, a determination is made as to the signal level. If SILENCE then, in step 75, the noise level timer is decremented and a return is made in step 77. If the signal level indicates that noise is present then, in step 76, the noise level timer is increased by three and then a return is made in step 77. Steps 75 and 76 provide a fast attack, slow decay response on detection of signals in the noise region. When noise is present, the noise level counter will be incremented by three for each ten millisecond period that the noise is present. If silence occurs then the noise level count will be decreased by one for each ten milliseconds that silence occurs. If, at decision 74, SOUND is detected then, in step 80, the sound time count is set to one. Then, in decision 81, a determination is made as to the dominant frequency of the signal. If the dominant frequency is in band one, 400 to 750 Hz, then the ring count is incremented in step 82 and, in step 83, the system proceeds to state 2. If the dominant frequency is not in band one then the system proceeds to state 2.

In state 2 the duration of the sound is evaluated. Either 300 milliseconds of continuous ring signal or 150 milliseconds of other sound must be present before control is transferred to state 3. After entering 90 state 2, a determination is made in decision 91 as to the signal level. If the signal level is not sound (OTHER) then, in step 92, the ring count is to zero and the system jumps to and immediately begins execution of state 1. If sound is present then, in step 93, the sound count and the elapsed time are incremented. Then, in decision 94, a determination is made as to whether the elapsed time has exceeded T1. If so then, in step 95, a NO RING event is declared. If not then, in decision 96, a determination is made as to the dominant signal frequency. If the dominant frequency is in band one then, in step 97, the ring count is incremented and then decision 100 is executed. However, if the dominant frequency is not in band one then decision 100 is executed. In decision 100 a determination is made as to whether the sound count is at least 15, which tests for 150 milliseconds of sound. If so then, in step 101, the system goes to state 3. If not then, in decision 102, a determination is made as to whether the ring count is at least 15, which tests for 150 milliseconds of ring or busy signal. If so then step 101 is executed. If not then a return is made in step 103.

State 3 makes a determination of the type of sound being received and, if the sound is neither a ring back signal or a busy signal, control is transferred to state 5. Upon entering 110 state 3, a determination 111 is made as to whether the signal level is sound or not. If not (OTHER) then, in decision 112, a determination is made as to whether the busy count is greater than the ring count. If not then step 114 is executed wherein the ring count, the busy count, and the noise level count are all set to zero, and the system jumps to and begins execution of state 4I. If the busy count is greater than the ring count then, in step 113, the busy pulse count is incremented and then step 114 is executed. If, at decision 111, the signal level indicates sound then the sound count and the elapsed time count are incremented in step 115. In decision 116 a determination is made as to whether the elapsed time has exceeded time T2, which is the analysis run time and which is the length of time that the program will be allowed to look for a voice signal before a NO ANSWER is declared. In the preferred embodiment, this is 27.5 seconds and is arrived at by multiplying the number of allowed rings, such as four, times a fall ring cycle time, which is conveniently set at 6.75 seconds. If the elapsed time has exceeded T2 then, in step 117, a NO ANSWER situation is declared. This will typically cause the record for that customer to be updated to show the no answer situation and cause the call to be rescheduled for a later time. If the elapsed time is not greater than T2 then, in decision 120, a determination is made as to the dominant frequency of the signal. If the dominant frequency is in band 2, 400 to 575 Hz, then decision 121 determines whether the ring count in less than 15. If not then a return is made in step 122. If the ring count is less than 15 then the ring count is incremented in step 123 and a return is made in step 122. If the frequency is in band 3, 575 to 750 Hz, a busy count is incremented in step 124 and a return is made in step 122. If the dominant signal frequency is not band 2 or band 3 (OTHER), then the ring count and the busy count are decremented in step 125. Then, in decision 126, a determination is made as to whether the ring count and the busy count are both equal to zero. If not a return is made in step 128. If so then, in step 125, the system goes to state 5. Steps/decisions 120–126 distinguish between ring signals, busy signals and other signals, such as voice signals. If the signal is a ring or a busy then the appropriate count is incremented. However, if the signal is neither one of these signals then both counts are decremented and a test is made to see whether both counts have reached zero. If both counts have reached zero then the sound (decision 111) may be an answer and should be analyzed further.

State 4 is a silence in progress state and the system stays in this state until sound lasting for at least 150 milliseconds has been detected. Upon entering 130 state 4I a decision 131 is made as to whether the number of busy pulses equals 2. If so then the called number is declared to be BUSY in step 132. Appropriate action for a called number which is busy is then taken, such as marking the record so that the call will be placed again at frequent intervals until an answer or a no answer is detected. If the number of busy pulses is not equal to 2 then the sound count is set to zero in step 133 and, in step 134, state 4 is entered and the elapsed time incremented. Decision 135 determines whether the elapsed time has exceeded time T2. If so then a NO ANSWER situation is declared in step 136. If not then decision 137 measures the signal level. If silence is present then, in step 140, the noise level count is decremented, the sound count is set to zero, and a return is made to state 4 (step 134). If the signal indicates that noise is present then, in step 141, the noise level count is incremented by 3, the sound count is set to zero, and a return is made to state 4. If the signal level indicates that sound is present then the sound count is incremented in step 142 and the dominant frequency is determined in step 143. If the dominant frequency is in band 1 then the ring count is incremented in step 144 and the process proceeds to decision 145. If the dominant frequency is other than band one then decision 145 is executed. Decision 145 test whether the sound count is at least 15. If not then a return is made in step 147 to state 4. If so then, in step 146, the system proceeds to state 3.

State 5 allows the user to select whether an answering machine detect is to occur quickly, reliably, or not at all. Upon entering 150 state 5, a determination 151 is made as to the machine detect selection made by the user. If machine detection was not selected then a LIVE ANSWER is declared in step 152. Typically, this will cause the called party to be connected with an agent and the record for the called party will be sent to and displayed on the agent's console. If reliable detection was selected, then, in decision 153, the signal level is measured. If sound is present, then, in step 154, the system goes immediately to and begins executing state 6. If sound is not present then decision 155 is executed. If the machine detect selection is FAST, decision 155 is executed. Decision 155 tests whether the noise level count is not greater than the maximum live noise level count. If so then a LIVE ANSWER is declared in step 156. If not then, in step 157, the system goes to state 6. In the preferred embodiment, the maximum live noise level is the maximum noise time count that may accrue and still allow a voice signal to be considered to be a live answer. A noise time count above this value will cause an ANSWER to be declared on the "trailing edge" of the signal and is subject to additional analysis before further processing. In the preferred embodiment, this is set at 9 milliseconds.

State 6 is executed when voice has been detected and the noise level prior to the voice signal is high enough to indicate that a machine may have answered the call. Upon entering 160 state 6, the run out count is incremented. Then, in decision 161, a determination is made as to whether the run out count is greater than 300. If so then the sound has exceeded the normal duration of a live answer and, in step 162, the system will declare that an answering machine has answered the call. A declaration that an answering machine has been detected will cause, in the preferred embodiment, an apology message to be played and the record will be marked for recall at a later time. If the run out count is not greater than 300 then, in decision 153, the signal level is measured. If SILENCE is present then the noise level count is decremented and the low count is incremented in step 164. The low count is used to measure the duration of of silent periods so that short periods of silence, such as less than 350 milliseconds, will not effect the determination that the sound present is continuous. Decision 165 tests whether the low count is greater than 35. If not then a return is made in step 166. If so then decision 167 determines whether the noise level is less than the maximum live noise level. If so then a LIVE ANSWER is declared in step 170. If not then an ANSWERING MACHINE is declared in step 171. If, at decision 163, the signal level indicated that noise was present then, in step 172, the noise level is incremented by 3 and a return is made to state 6. If, at decision 163, a determination is made that sound is present then, in step 173, the sound count is incremented. Decision 174 then tests whether the noise level count is at least 150 (1500 milliseconds). If so, then a declaration is made in step 175 that the call was answered by an answering machine. If not then, in step 180, a return is made to state 6.

As stated above, one state is executed for each 10 millisecond period, except where previously noted. Therefore, a sound count of one indicates that sound has been present for 10 milliseconds, a sound count of 2 indicates that sound has been present for 20 milliseconds, etc. The process discriminates between voice and telephone company signals by performing a frequency analysis on the signals. If the dominant signal frequency is a frequency in the ring signal band or the busy signal band then a ring count or a busy count will be incremented. It should be noted that, in order to prevent a noise spike or other extraneous signal, which may occur in the middle of a ring signal or a busy signal, from causing an answer to be detected, the preferred embodiment requires that the presence of a sound which is not a ring signal or a bus), signal causes the ring counter and the busy counter to be decremented. Once both the ring counter and the busy counter have been decremented to zero then, if the sound is still present, a determination may be made as to whether the sound is an answer because the sound has persisted long enough to warrant further analysis. In the preferred embodiment, the ring count may go between zero and five, the busy count may go between zero and five, and the noise level count may go between zero and 150.

Turn now to FIG. 5 which is a block diagram of the preferred embodiment of the present invention. A host 200, such as a mainframe computer, is connected via bus 205 to a plurality of agent stations 201, a trunk switching device 202, a call processor 203, and a controller 204. Bus 205, which is preferably a network, such as a local area network, is used to transfer instructions and data, such as client records and agent status information, among the various devices. Agent stations 201, trunk switching device 202 and call processor 203 are preferably further connected by bus 206, which may be an analog bus or a digital bus, and is used to transfer audio signals, such as voice and messages, among the components. Although bus 205 and bus 206 are shown as separate buses it will be appreciated that it is possible to use a single bus to transfer instructions, data and audio signals. Trunk switching device 202 and call processor 205 are further connected to telephone trunks 207, which may be analog trunks, T-1 trunks, ISDN trunks, etc.

Host 200 contains customer records. Agent stations 201 each have an agent terminal and an audio communications device such as a headset or a handset. The agent terminal has a display for presenting data to the agent and a keyboard to allow the agent to enter information, such as updating an existing customer record or creating a new customer record. Trunk switching device 52 is used to connect a selected agent station 201A to a selected one of the telephone trunks 207. Trunk switching device 202 may be also used to selectively connect a function of call processor 203, such as message playing, message recording, dialing, call progress monitoring, etc., to a selected one of the telephone trunks 207. Alternatively, call processor 203 may be directly connected to telephone trunks 207. In the preferred embodiment, controller 204 obtains customer record information from host 200, and causes call processor 203 to initiate outbound calls and monitor the status of these outbound calls. Controller 204 may also cause call processor 203 to monitor telephone trunks 207 for inbound calls, play or record messages on telephone trunks 207, place or decode DTMF or voice signals on telephone trunks 207, etc. The operation of the individual components of the preferred embodiment shown in FIG. 5 are described briefly in FIG. 6 and in detail in the referenced documents. Although controller 204 is shown as being a distinct component, it will be appreciated that, if desired, the functions of controller 204 may be performed by host 200. It will also be appreciated that, rather than having a central control point such as controller 204, the controller function may be distributed so that the host 200 and/or the agent stations perform the controller functions. Therefore, it should be understood that the present invention is not limited to use with a system having the configuration shown, but is useful with both centralized control systems and distributed control systems.

In the preferred embodiment, controller 204 would obtain a plurality of customer records from host 200, extract the telephone number from a customer record, and cause call processor 203 to place an outbound call by dialing the telephone number on a selected trunk of trunks 207 and then to monitor the status of the outbound call. Controller 204 monitors the status of agent stations 201 by monitoring the talk time for each call, preferably distinguishing inbound calls from outbound calls. By monitoring the present talk time of an agent and comparing that against the previous talk times of that agent controller 204 can estimate or predict when a particular agent may become available. Controller 204 adjusts the rate at which call processor 203 places outbound calls so that an outbound call is expected to be answered at approximately the same time that an agent is expected to become available. When the outbound call is answered controller 204 causes trunk switching device 202 to connect the trunk on which the outbound call was placed to an available agent at an agent station 201. However, if an agent is not available when the call is answered, controller 204 will cause call processor 203 to play an apology message for that outbound call and then terminate the call by hanging up. Controller 204 instructs call processor 203 which voice/gender/message text combination to play. Alternatively, the voice/gender/message text combination may be stored in controller 204 in digital form and call processor 203 may perform the task of changing the signals from controller 204 into signals suitable for transmission over the telephone trunks 207.

Turn now to FIG. 6 which is a block diagram of a typical call processor 203. Call processor 203 is preferably constructed to handle both incoming and outgoing calls although, for purposes of the present invention, it is only necessary that the call processor 203 accommodate outbound calls. Call processor 203 preferably contains a dialer 203A, a call progress monitor 203B and message player/recorder 203C, a dual-tone multiple-frequency DTMF decoder 203D, a voice recognition (decoder) module 203E, an incoming call detector (ring detector) 203F, ANI/DNIS decoders 203G, and a call processor control 53H. In one embodiment, components 203A–203E are connected to bus 206 and components 203F and 203G are connected to bus 207. This allows components 203A–203E to be used on any of the trunk lines, as selected by trunk switching unit 202. Of course, it will be appreciated that all of the components may be connected to bus 206 or all of the components may be connected to bus 207 but the number of components required for multiple lines may increase, thereby increasing the overall cost of the system. It will be appreciated that the allocation of components between bus 206 and bus 207 need not be as described above but may be selected so as to fit a particular requirement. The operation of the components of call processor 203 have generally been described in the referenced documents. However, call progress monitor 203B, in addition to detecting ring, busy and no answer events, also performs or assists in the performance of the answering machine detection process. Call progress monitor 203B may perform the answering machine detection process described in conjunction with FIG. 4. However, call progress monitor 203B may also be an analog-to-digital processor, or another processor which processes and converts the signals on the telephone trunks into a format used by call processor control unit 203H, controller 204 and/or host 200. Furthermore, it would be appreciated that the call processing and answering machine detection process may, if desired, be performed by call processor control unit 203H, controller 204, or host 200 or a combination thereof. Therefore the block diagram should be understood as being representative of the types of functions that should be performed and not as limitation on how a function is to be performed or what component is to perform the function.

In the operation of the preferred embodiment, host 200 or controller 204 would send, through call processor control unit 203H, to dialer 203A the telephone number to be dialed. If dialer 203A was connected to bus 207 then dialer 203A would seize (go off hook) a trunk line and begin dialing. If dialer 203 is connected to bus 206 then host 200 controller 204 or call processor control unit 203H would instruct trunk switch 202 to connect a selected trunk of trunks 207 to dialer 203A. Then, call progress monitor 203B would monitor the status of the call to detect whether a busy, ring, no ring or no answer condition is present and, if an answer is detected, would determine whether the answer was made by a live person or by a machine. If by a machine, or if by a person and an agent was not available to handle the call, then host 200, controller 204 or call processor control unit 203H would cause message player 203C to begin playing a termination message to the called party.

Figure 7:
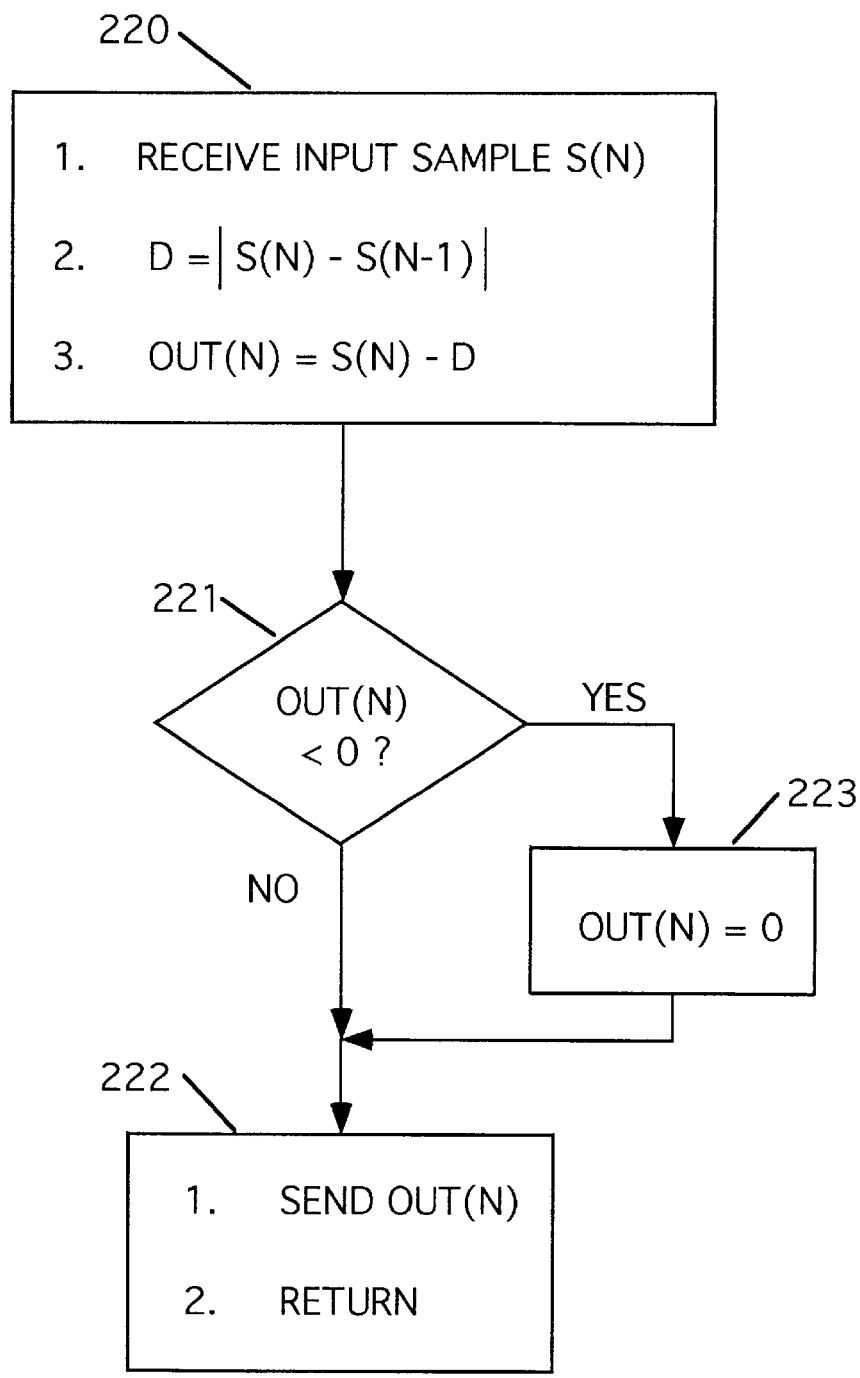
FIG. 7 is a flow chart of the noise suppression technique used in the present invention.

Turn now to FIG. 7 which is an illustration of a noise suppression technique. In some areas, particularly in some countries, die incoming signal on the telephone line may be corrupted by noise bursts, including bursts which have a pattern like that of ignition noise. In such areas the noise bursts may be occasionally interpreted as in answer, even while the ringing signal is still appearing on the line. To minimize the effects of such noise a background program is used to process the incoming signal samples before they are provided to the answering machine detection process of the present invention. In step 220, the current signal sample S(N) is received, the magnitude of the difference (D) between the current sample S(N) and the previous sample S(N-1) is determined, and then the output sample, which is to be provided to the answering machine detection process, is determined as OUT(N) is equal to S(N)–D. By this process, the output sample is reduced by the magnitude of the difference between the current and previous incoming samples. This has the effect of eliminating a noise spike. If sample S(N-1) was a noise spike then the value OUT(N) may be less than zero, which is not desired for the operation of the preferred embodiment of the present invention. Therefore, decision 221 tests whether OUT(N) is less than zero. If not then, the output value is acceptable and, in step 222, OUT (N) is provided to the answering machine detection process and a return is made. However, if the value OUT(N) is less than zero then, in step 223, the, value of OUT(N) is set to zero, and then OUT(N) is provided to the answering machine detection process and a return is made in step 222.

The table illustrates the examples of input samples and the resulting output samples. The first case illustrates an input signal having an arbitrary value of two, with a noise spike having an arbitrary value of thirteen appearing in the input signal stream. It will be noted that the output samples are slightly delayed from the input samples. This delay has been exaggerated in the table for clarity of illustration. It will be noted that for the first three input values the output values are equal to the input values. However the fourth input value is the noise spike and, therefore, the fourth output value remains unchanged. For the fifth input value the noise spike disappears and, as a result of the decrease from a value of thirteen to a value of two on the input signal, the output signal momentarily drops to zero. For the remainder of the input signals shown the input signals do not change and, therefore, the output signals do not change.

The second case illustrates an input signal stream having an arbitrary value of two, which is interrupted by a signal having an arbitrary value of thirteen. As in the first came, it will be noted that as long as the value of the input stream remains constant the value of the output stream remains constant. When the input stream first rises to a value of thirteen the output stream remains unaffected. However, for the second and third occurrences of the value thirteen in the input stream, the output stream rises to follow the input stream. Then, when input the stream returns to the value of two, the output stream momentarily drops to zero and then returns to the value of two. As stated above, the samples are ten millisecond samples and therefore the signal having the value of thirteen has a duration of approximately thirty milliseconds. This duration indicates that the signal is probably not noise and therefore should be passed on to the answering machine detection circuitry. As shown above, the noise suppression process does pass the signal on that the answering machine detection process for further analysis.

The third case illustrates an ignition noise problem. The input signal repeatedly varies between an arbitrary value of two and an arbitrary value of thirteen. It will be noted that the output stream therefore varies between a value of two and a value of zero, thereby effectively suppressing the ignition noise spike.

|     |         |                    |
| --- | ------- | ------------------ |
| (1) | INPUT:  | 2 2 2 13 2 2 2 2   |
|     | OUTPUT: | 2 2 2   2 0 2 2 2  |
| (2) | INPUT:  | 2 2 2 13 13 13 2 2 |
|     | OUPUT:  | 2 2 2  2 13 13 0 2 |
| (3) | INPUT:  | 2 13 2 13 2 13 2 13|
|     | OUPUT:  |  2   2 0 2 0 2 0 2 |

It will be noted hat this process has the effect of narrowing, by one sample period, the duration of signals appearing on the input signal stem. As shown, the input signal steam has a signal which has a value of thirteen for three sample periods whereas the output signal stream has a signal which has a value of thirteen for two sample periods. In some cases it may be desirable that the output duration not be reduced, or that the output value not go to zero in response to a noise spike on the input signal stream. In such a case step 223 would be modified so that OUT(N) is equal to OUT(N−1) instead of equal to zero. In cases one and three, this would make the output stream have the value of two during the time period shown. In case two, this would make the output stream have a duration of thirteen for three sample periods, the same as the input steam.

In the preferred embodiment, the system shown also accommodates inbound calls in the manner described in the referenced documents.

It will be appreciated from the above that the present invention describes a method and an apparatus which provides for non-offensive termination of an outbound call which has been answered before an agent has become available to handle the call or which has been determined to have been answered by an answering machine. The present invention contemplates the use of a plurality of voice/gender/message text combinations so that, in the event it is necessary to terminate a call to a particular party more than once, the called party will believe that the calls were made by unrelated parties and/or were purely coincidental. The present invention also contemplates the use of a different trunk line each time that a recall is made to a particular party so as to avoid call blocking if such is implemented by the called party and so as to provide a different number on an ANI or a called ID display, if such is used by the called party, so that the called party will believe that the calls were made by unrelated parties and/or were purely coincidental. The present invention also contemplates measuring signal levels, frequencies, and durations to determine whether an answer is by a live person or by an answering machine. Other embodiments of the present invention may suggest themselves those of skill in the art based upon a reading of the foregoing disclosure. Therefore, the present invention is to be limited only by the claims below.

We claim:

1. A method for processing outbound calls, comprising the steps of:

placing an outbound call to a called party;

determining whether said outbound call has been answered;

if said outbound call has been answered then determining whether said outbound call was answered by a machine;

if said outbound call was answered by a machine then playing, for said outbound call, a message which intentionally conceals from a party hearing said message at least one of the reason for said outbound call or the source of said outbound call so as to reduce the likelihood of at least one of the following: that said called partly will activate call blocking, that said called party will activate last call callback, or that said called party will monitor a calling number identification display to determine the telephone number of the calling party; and then terminating said outbound call;

if said outbound call was not answered by a machine then determining whether an agent is available to handle said outbound call;

if an agent is not available to handle said outbound call then playing, for said outbound call, a message which conceals at least one of the reason for said outbound call or the source of said outbound call from a party hearing said message played in response to an agent not being available, and then terminating said outbound call.

2. A method for processing outbound calls, comprising the steps of:

placing an outbound call to a called party;

determining whether said outbound call has been answered;

if said outbound call has been answered then determining whether said outbound call was answered by a machine;

if said outbound call was answered by a machine then playing, for said outbound call, a message which intentionally conceals from a party hearing said message at least one of the reason for said outbound call or the source of said outbound call so as to reduce the likelihood of at least one of the following: that said called party will activate call blocking, that said called party will activate last call callback, or that said called party will monitor a calling number identification display to determine the telephone number of the calling party; and terminating said outbound call;

said step of playing said message comprising selecting, for said message, a language out of a plurality of languages which conceal from said called party at least one of the reason for said outbound call or the source of said outbound call.

3. A method for processing outbound calls, comprising the steps of:

placing an outbound call to a called party;

determining whether said outbound call has been answered;

if said outbound call has been answered then determining whether said outbound call was answered by a machine;

if said outbound call was answered by a machine then playing, for said outbound call, a message which intentionally conceals from a party hearing said message at least one of the reason for said outbound call or the source of said outbound call so as to reduce the likelihood of at least one of the following: that said called party will activate call blocking, that said called party will activate last call callback, or that said called party will monitor a calling number identification display to determine the telephone number of the calling party; and terminating said outbound call;

said step of playing said message comprising selecting, for said message, a gender for a voice which conceals from said called party at least one of the reason for said outbound call or the source of said outbound call.

4. A method for processing outbound calls, comprising the steps of:

placing an outbound call to a called party;

determining whether said outbound call has been answered;

if said outbound call has been answered then determining whether said outbound call was answered by a machine;

if said outbound call was answered by a machine then playing, for said outbound call, a message which intentionally conceals from a party hearing said message at least one of the reason for said outbound call or the source of said outbound call so as to reduce the likelihood of at least one of the following: that said called party will activate call blocking, that said called party will activate last call callback, or that said called party will monitor a calling number identification display to determine the telephone number of the calling party; and terminating said outbound call;

said step of playing said message comprising selecting, for said message, a child's voice out of a plurality of voices which conceal from said called party at least one of the reason for said outbound call or the source of said outbound call.

5. A method for processing outbound calls, comprising the steps of:

placing an outbound call to a called party;

determining whether said outbound call has been answered;

if said outbound call has been answered then determining whether said outbound call was answered by a machine;

if said outbound call was answered by a machine then playing, for said outbound call, a message which intentionally conceals from a party hearing said message at least one of the reason for said outbound call or the source of said outbound call so as to reduce the likelihood of at least one of the following: that said called party will activate call blocking, that said called party will activate last call callback, or that said called party will monitor a calling number identification display to determine the telephone number of the calling party; and terminating said outbound call;

said step of playing said message comprising selecting, for said message, a message text out of a plurality of messages texts which conceal from said called party at least one of the reason for said outbound call or the source of said outbound call.

6. An apparatus for processing outbound calls, comprising:

first means for initiating an outbound call to a called party by dialing a telephone number on a telephone trunk;

second means for playing a message, for said outbound call, which intentionally conceals from said called party at least one of the reason for said outbound call or the source of said outbound call so as to reduce the likelihood of at least one of the following: that said called party will activate call blocking, that said called party will activate last call callback, or that said called party will monitor a calling number identification display to determine the telephone number of the calling party, said second means having a plurality of combinations of voice, gender, and message text which conceal from said called party at least one of the reason for said outbound call or the source of said outbound call; and third means for providing said telephone number to said first means, for determining whether said outbound call has been answered by a machine, for causing said second means to play said message for said outbound call if said outbound call was answered by a machine, and for terminating said outbound call after said message has been played, said third means instructing said second means which of said combinations is to be used as said message to be played for said outbound call.

7. An apparatus for processing outbound calls, comprising:

first means for initiating an outbound call to a called party by dialing a telephone number on a telephone trunk;

second means for playing a message, for said outbound call, which intentionally conceals from said called party at least one of the reason for said outbound call or the source of said outbound call so as to reduce the likelihood of at least one of the following: that said called party will activate call blocking, that said called party will activate last call callback, or that said called party will monitor a calling number identification display to determine the telephone number of the calling party, said second means playing said message by converting message signals into a form suitable for transmission over said telephone trunk; and third means for providing said telephone number to said first means, for determining whether said outbound call has been answered by a machine, for causing said second means to play said message for said outbound call if said outbound call was answered by a machine, and for terminating said outbound call after said message has been played, said third means containing a plurality of combinations of voice, gender, and message text which conceal from said called party at least one of the reason for said outbound call or the source of said outbound call, and said third means selects which of said combinations is to be used, and sends the selected combination as said message signals to said second means.

8. A method for detecting an answer of an outbound call on a telephone trunk by machine, comprising the steps of:

comparing the level of a signal on said telephone trunk with a threshold level;

measuring the period that said level of said signal is above said threshold level;

comparing said period to a predetermined duration, said predetermined duration being longer than the duration of a normal live answer; and declaring said outbound call to have been answered by machine if said period exceeds said predetermined duration.

9. A method for detecting an answer of an outbound call on a telephone trunk by machine, comprising the steps of:

comparing the level of a signal on said telephone trunk with a first threshold;

measuring the period that said level is above said first threshold;

comparing the level of said signal on said telephone trunk with a second threshold;

measuring the period that said level is above said second threshold; and if said period that said signal is above said first threshold exceeds a first duration, and said period that said signal is above said second threshold exceeds a second duration, said second duration being longer than the duration of a normal live answer, then declaring said outbound call to have been answered by a machine.

* * * * *